US011074239B2

(12) United States Patent
Polinati et al.

(10) Patent No.: US 11,074,239 B2
(45) Date of Patent: Jul. 27, 2021

(54) DE-DUPLICATION OF CONFIGURATION ITEMS RELATED TO A MANAGED NETWORK

(71) Applicant: ServiceNow, Inc., Santa Clara, CA (US)

(72) Inventors: Chinna Babu Polinati, Kirkland, WA (US); Madhavi Puvvada, Kirkland, WA (US); Romit Banerjee, Kirkland, WA (US); Nikhil Lakshman, Kirkland, WA (US); Brandon Thomas Trudel, Kirkland, WA (US); Vivian Tero, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 733 days.

(21) Appl. No.: 15/905,146

(22) Filed: Feb. 26, 2018

(65) Prior Publication Data

US 2019/0266268 A1    Aug. 29, 2019

(51) Int. Cl.
*G06F 16/23* (2019.01)
*G06F 16/25* (2019.01)
*G06F 9/50* (2006.01)

(52) U.S. Cl.
CPC ........ *G06F 16/2365* (2019.01); *G06F 9/5061* (2013.01); *G06F 16/252* (2019.01)

(58) Field of Classification Search
CPC ............................ G06F 16/2365; G06F 16/252
USPC ....................................................... 707/692
See application file for complete search history.

(56) References Cited

U.S. PATENT DOCUMENTS

| 5,978,594 | A  | 11/1999 | Bonnell |
|-----------|----|---------|---------|
| 6,321,229 | B1 | 11/2001 | Goldman |
| 6,816,898 | B1 | 11/2004 | Scarpelli |
| 6,895,586 | B1 | 5/2005  | Brasher |
| 7,020,706 | B2 | 3/2006  | Cates |
| 7,027,411 | B1 | 4/2006  | Pulsipher |
| 7,392,300 | B2 | 6/2008  | Anantharangachar |
| 7,617,073 | B2 | 11/2009 | Trinon |
| 7,716,353 | B2 | 5/2010  | Golovinsky |
| 7,769,718 | B2 | 8/2010  | Murley |
| 7,877,783 | B1 | 1/2011  | Cline |
| 7,912,813 | B2 | 3/2011  | Rajaraman et al. |
| 7,925,981 | B2 | 4/2011  | Pourheidari |
| 7,945,860 | B2 | 5/2011  | Vambenepe |
| 8,402,127 | B2 | 3/2013  | Solin |
| 8,554,750 | B2 | 10/2013 | Rangaranjan |
| 8,612,408 | B2 | 12/2013 | Trinon |
| 8,832,652 | B2 | 9/2014  | Mueller |

(Continued)

*Primary Examiner* — Kimberly L Wilson
(74) *Attorney, Agent, or Firm* — Fletcher Yoder PC

(57) ABSTRACT

A system may include a database containing representations of configuration items associated with a managed network that is managed by a remote network management platform. The system may also contain a server device that may be configured to determine a set of duplicate representations of a particular configuration item of the configuration items. The configuration items may relate to computing devices and software applications disposed within the managed network. The server device may be further configured to generate a master representation from the set of duplicate configuration items. The server device may replace, in the database, the set of duplicate representations with the master representation.

19 Claims, 13 Drawing Sheets

(56) References Cited

U.S. PATENT DOCUMENTS

| | | |
|---|---|---|
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 2008/0021917 A1* | 1/2008 | Baker ............... H04L 41/08 |
| 2009/0193046 A1 | 7/2009 | Desai et al. |
| 2010/0179945 A1 | 7/2010 | Rangarajan et al. |
| 2011/0112973 A1 | 5/2011 | Sanghvi |
| 2012/0096163 A1* | 4/2012 | Tai ............... G06F 16/2365 |
| | | 709/226 |
| 2013/0117219 A1 | 5/2013 | Malka et al. |
| 2013/0226868 A1 | 8/2013 | Messinger et al. |
| 2017/0262586 A1* | 9/2017 | Bess ............... G06F 16/2462 |
| 2017/0308601 A1 | 10/2017 | Messinger et al. |

* cited by examiner

| ☰ REMEDIATE DUPLICATE TASKS (DE-DUPLICATION TASKS) | | Search | | Remediate 600 |
|---|---|---|---|---|
| ☰ ID Number | ☰ Short Description | ☰ Priority | ☰ Number of Duplicates | ☰ Opened by |
| ⊘ TASK031 | Duplicate records found in 1 class: Computer | Low | 141 | System |
| ⊙ TASK032 | Duplicate records found in 1 class: Computer | Low | 15 | System |
| ⊙ TASK033 | Duplicate records found in 1 class: Server | High | 11 | System |
| ⊙ TASK034 | Duplicate records found in 1 class: Application | Medium | 144 | System |
| ⊙ TASK035 | Duplicate records found in 1 class: Printer | Low | 22 | System |
| ⊙ TASK036 | Duplicate records found in 1 class: Printer | Low | 5 | User01 |

(TASK031–TASK035 grouped as 602)

FIG. 6

RECONCILE DUPLICATE TASK

[Cancel] [Remediate Manually] 700

| Select Master Representation 702 | Merge Attribute Values 704 | Merge Relationships and Related Items 706 | Use Master Representation | Duplicate Representation Actions 708 | Review and Confirm 710 |

Select Master Representation 712

Select a master representation to keep. System recommendations for the master representation are based on discovery dates, creation dates, as well as other representation-specific details.

The rest of the duplicate representations will be merged into the master representation.

[Recommended] [All]
714

| | Name | Recommendation | Class | Created | Updated | Related Items |
|---|---|---|---|---|---|---|
| ✓ | PC 122 | Oldest Created | Computer | 2019-01-01 | 2019-01-01 | 10 Items |
| ☐ | PC 122 ⎫ 716 | Most Related Items | Computer | 2019-02-05 | 2019-02-10 | 15 Items |
| ☐ | PC 122 ⎭ | Newest Updated | Computer | 2019-01-01 | 2019-03-15 | 9 Items |

FIG. 7A

RECONCILE DUPLICATE TASK

| Cancel | | 708 | Back | Next | 700 |

Select Master Representation 702 → Merge Attribute Values 704 → Merge Relationships and Related Items 706 → Duplicate Representation Actions 708 → Review and Confirm 718

Merge Attribute Values
Inconsistent attribute values in the duplicate representations are shown.
Choose a value from any duplicate representation to overwrite the value in the master representation attribute, or click "Next" to use all the master representation values.

| Attribute | Master Representation Value | Other Values |
|---|---|---|
| Installed | 2018-12-30 | 128 Other Values |
| Warranty expiration | | 120 Other Values |
| Asset tag | PC0122 | 140 Other Values |
| Order received | | 80 Other Values |
| Cost center | Engineering | 1 Other Value |
| Assigned | 2019-03-20 | 127 Other Values |
| Purchased | | 12 Other Values |
| PO Number | | 12 Other Values |

RECONCILE DUPLICATE TASK

| | | | | Cancel | Back | Next |

Select Master Representation _702_ > Merge Attribute Values _704_ > Merge Relationships and Related Items _706_ > Duplicate Representation Actions _708_ > Review and Confirm _710_

Duplicate Representation Actions _726_

Select how duplicate representations are treated after being merged to the master representation.

ⓘ Duplicant representations will be deleted. This action cannot be undone.

☑ Delete
☐ Retire

FIG. 7D

DE-DUPLICATION OF CONFIGURATION ITEMS RELATED TO A MANAGED NETWORK

BACKGROUND

A managed network may use tens, hundreds, or thousands of individual computing devices to facilitate interrelated or standalone operations. A configuration management database (CMDB) may include configuration items associated with these devices. That is, the configuration management database may include representations of the computing devices, the software applications installed on the computing devices, relationships therebetween, and configurations thereof. Such configuration items might be used by the managed network to more efficiently carry out information technology service management, information technology operations management, configuration management, and other operations. Thus, inaccuracies in configuration items may negatively affect the efficacy with which these operations are performed. Furthermore, duplicate representations of the same configuration item can result in ambiguity with respect to at least some of these operations, and waste storage space in the CMDB.

SUMMARY

The embodiments herein relate to removing duplicate representations of a configuration item from a CMDB. A client device associated with the managed network may interact with a de-duplication task tool that facilitates the consolidation of a plurality of duplicate representations of the configuration item into a single, master representation stored in the CMDB. This tool may be web-based and provide graphical user interfaces that walk the user through the de-duplication process in a safe fashion. Advantageously, this master representation not only reduces storage requirements of the CMDB, but also helps prevent future duplicate representations of the configuration item from being added to the CMDB.

Accordingly, a first example embodiment may involve a remote network management platform that may include a database containing representations of configuration items associated with a managed network that is managed by the remote network management platform. The configuration items may relate to computing devices and software applications disposed within the managed network. The remote network management platform may further include a server device. The server device may be configured to (i) determine a set of duplicate representations of a particular configuration item of the configuration items, (ii) generate and provide, to a client device, a graphical user interface including a first plurality of data entry fields that respectively correspond to the set of duplicate representations, (iii) generate a master representation based on a duplicate representation corresponding to a selected data entry field from the first plurality, (iv) generate and provide, by way of the graphical user interface, a second plurality of data entry fields that correspond to attribute values within the set of duplicate representations, (v) set the master representation to include attribute values corresponding to one or more selected data entry fields from the second plurality, and (vi) replace, in the database, the set of duplicate representations with the master representation.

In a second example embodiment, a method may include determining, by a server device associated with a remote network management platform, from a plurality of representations of configuration items stored in a database associated with the remote network management platform, a set of duplicate representations of a particular configuration item of the configuration items. The configuration items may relate to at least computing devices and software applications disposed within the managed network. The method may further include generating and providing, by the server device to a client instance, a first plurality of data entry fields that respectively correspond to the set of duplicate representations. The method may additionally include generating, by the server device, a master representation based on a duplicate entry corresponding to a selected data entry field from the first plurality. The method may still further include generating and providing, by the server device, a second plurality of data entry fields that correspond to attribute values within the set of duplicate representations. The method may yet further include setting, by the server device, the master representation to include attribute values corresponding to one or more selected data entry fields from the second plurality. The method may additionally include replacing, by the server device, in the database, the set of duplicate representations with the master representation.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a graphical user interface, in accordance with example embodiments.

FIGS. 7A, 7B, 7C, 7D, and 7E depict panes of another graphical user interface, in accordance with example embodiments.

DETAILED DESCRIPTION

Figure 1:
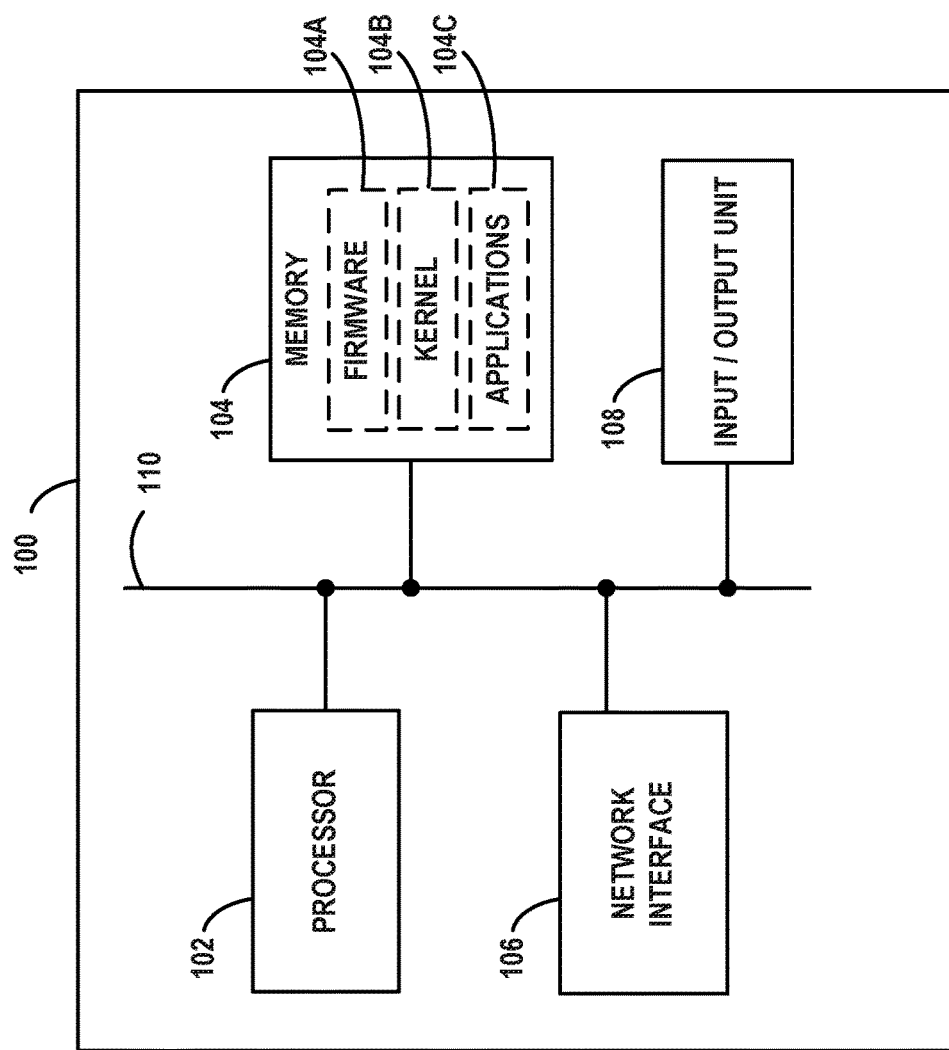
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software applications, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
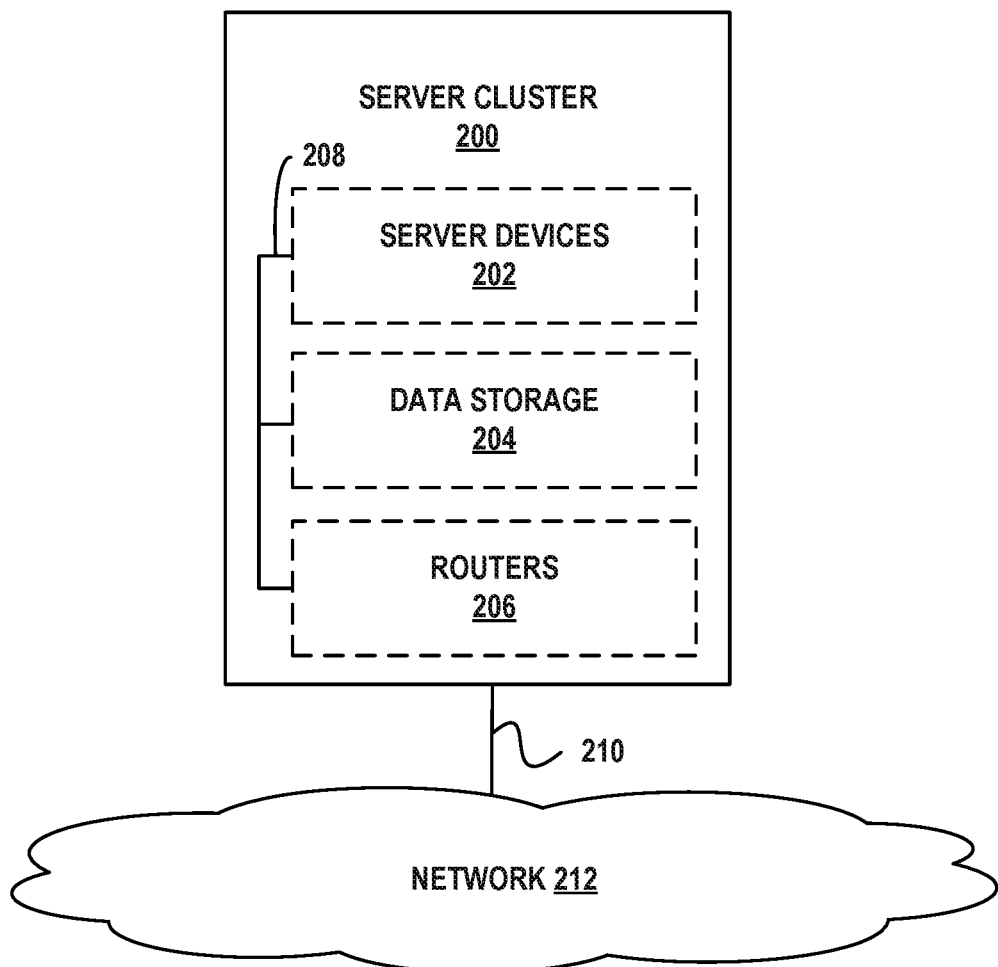
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
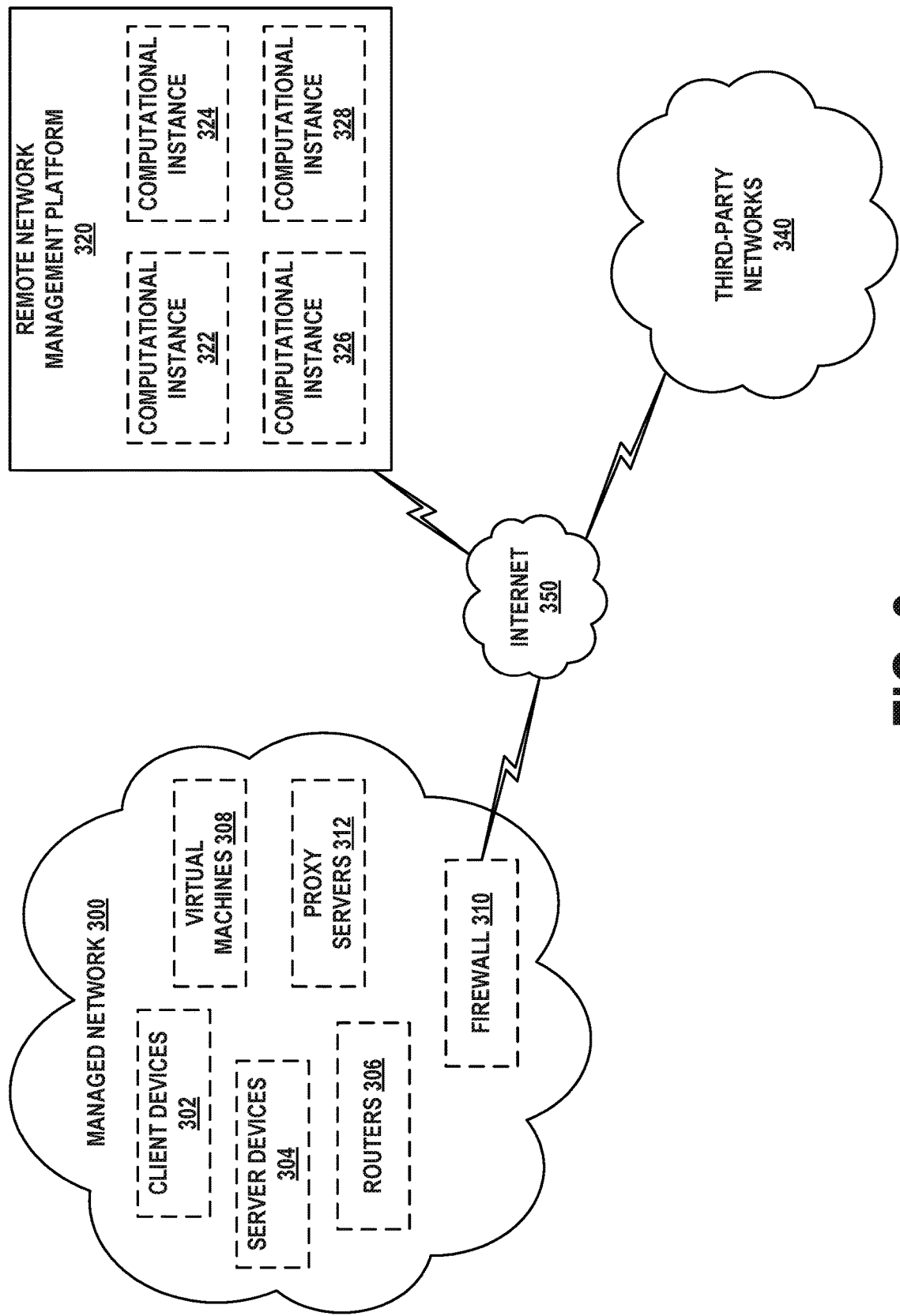
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
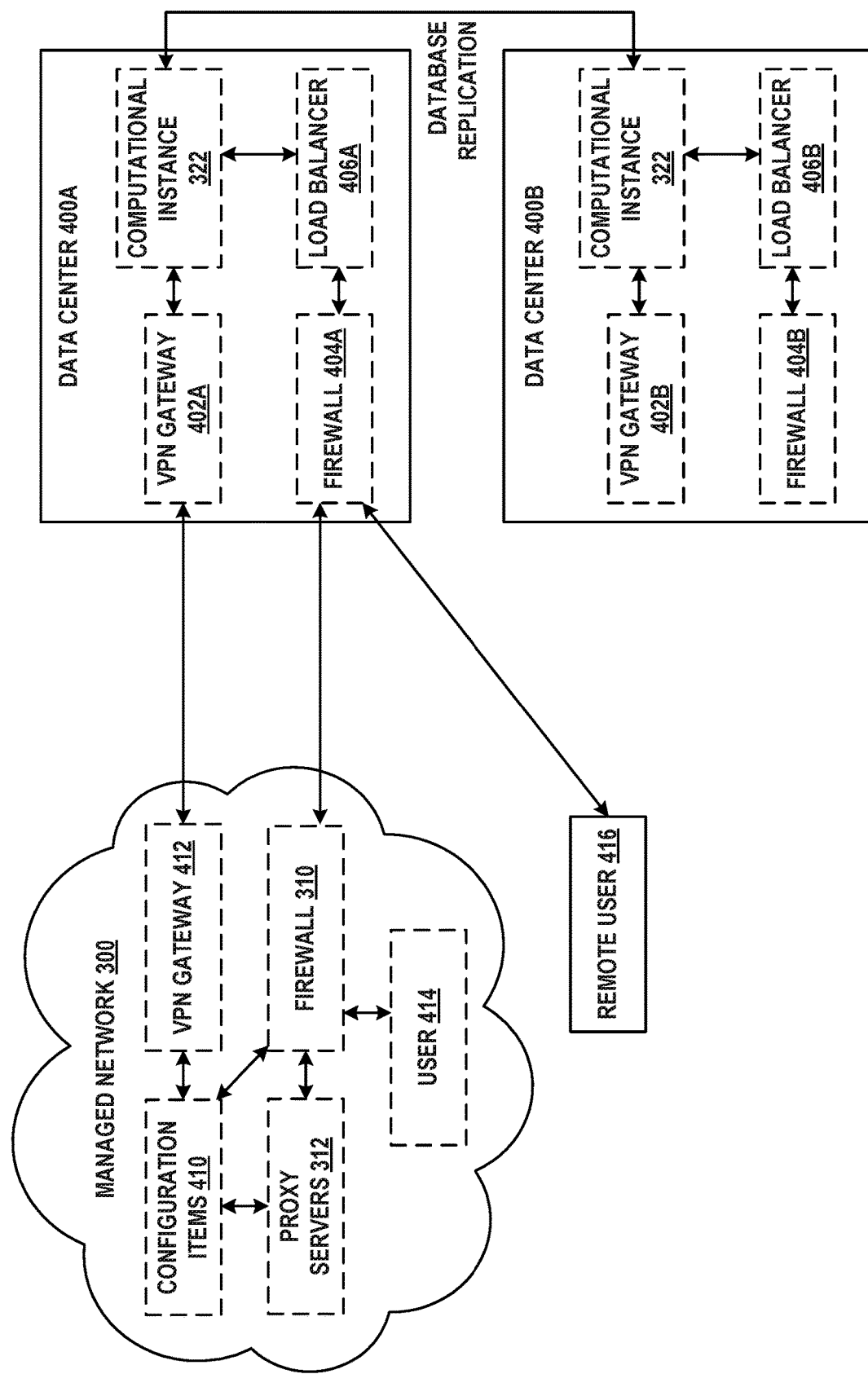
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
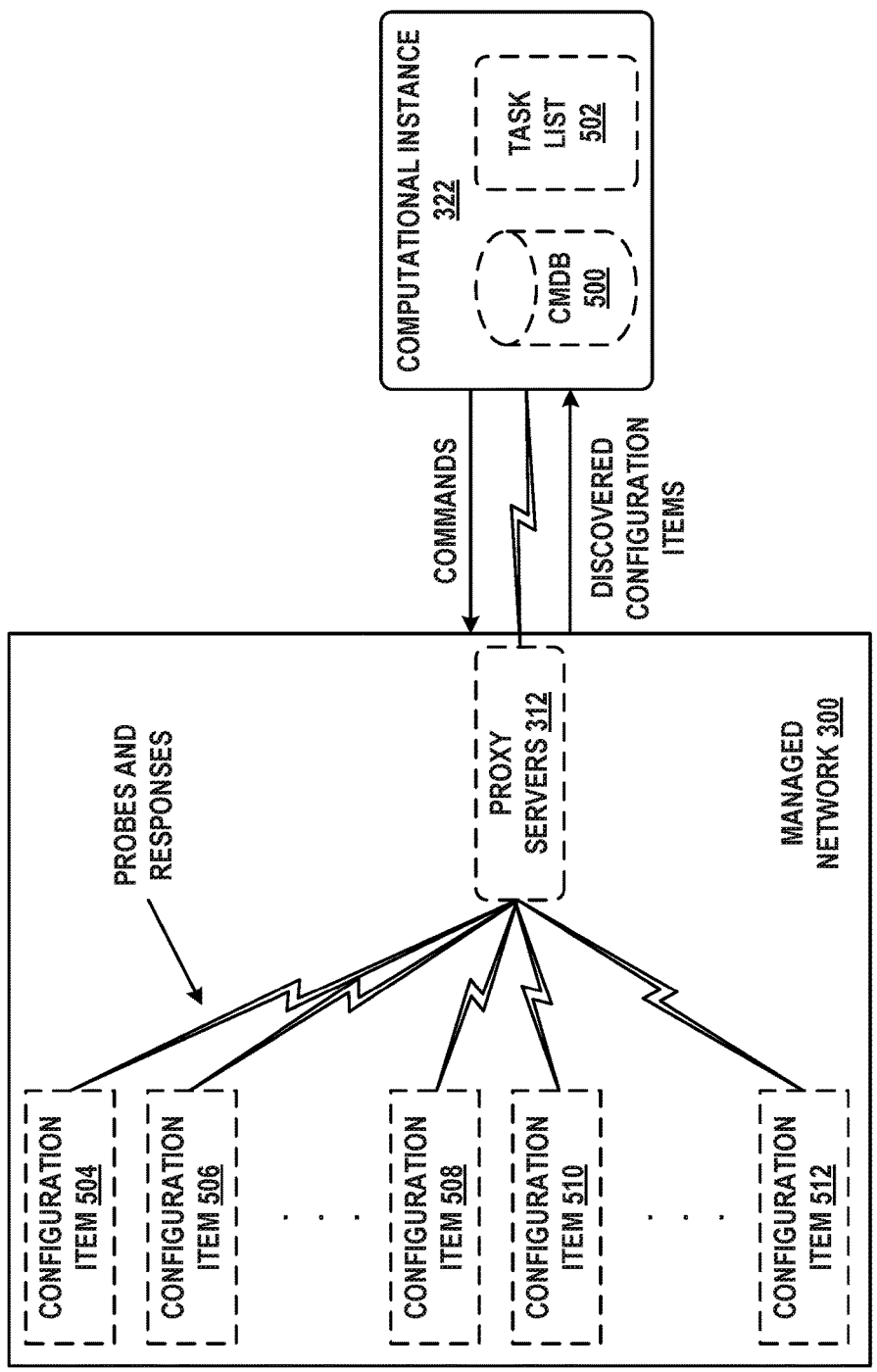
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
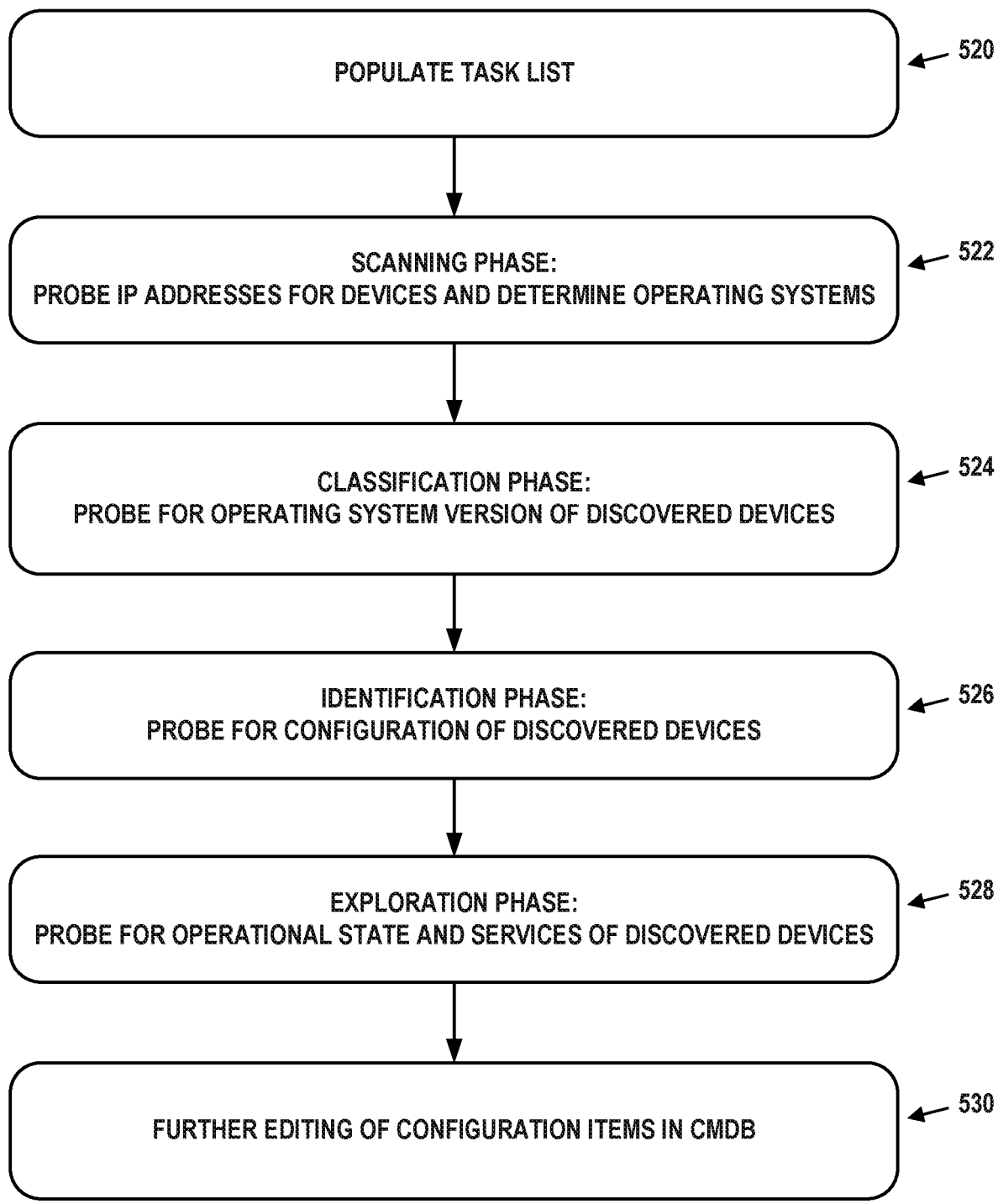
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned priorities that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE DE-DUPLICATION SYSTEM

As described above, an identification and reconciliation API may allow for configuration item entries to be vetted by using identification rules and reconciliation rules. However, ineffective identification rules and reconciliation rules may result in duplicate representations of the same configuration item. Additionally, multiple data sources may be authoritative for the same configuration item or attributes thereof. Such authoritative data sources may change over time as identification rules and reconciliation rules are altered. Consequently, duplicate representations of configuration items may be created during discovery even where identification rules are set properly.

Duplicate representations of configuration items inaccurately represent which configuration items reside within a managed network. For example, having duplicate representations of the same server may indicate to an enterprise that it has more processing and/or storage capabilities than it actually has. Based on such an inaccuracy, resources such as the server, and applications that execute on the server, may be improperly allocated. Duplicate configuration items may also negatively affect the operational integrity of the managed network. For example, records of a security incident associated with a duplicate configuration item may indicate to a security operations component of the managed network managed network is threatened, even if the threat is actually minimal or non-existent. Example embodiments are provided below that describe systems and methods for consolidating or "de-duplicating" duplicate representations of configuration items such that the CMDB accurately represents the configuration items in the managed network.

An initial step in de-duplicating representations of configuration items may include detecting the duplicate representations of configuration items. As noted above, detecting these duplicate representations may occur during reconciliation. For example, the representations of configuration items may be analyzed to determine whether any possess the same or similar attribute values. In particular, values of attributes specified in an identification rule can be compared to determine whether any representations determined using the identification rule have the same or similar attribute values. Representations of configuration items having the same or similar attribute values may be grouped together for de-duplication.

A "de-duplication task" may be associated with a given grouping of representations of configuration items. This task may be presented to a user via a GUI. For example, the user may access a web-based software application associated with the remote network management platform using a client device equipped with a web browser. The application may provide a GUI that allows the user to manage aspects of the enterprise, and may include multiple menus that allow the user to navigate within the application. A user may use one such menu to navigate to a de-duplication tasks pane that presents an option to select one or more de-duplication tasks.

Once an input is received that indicates a de-duplication task has been selected, a sequence of panes may be presented to the user via the GUI. The sequence of panes guides the user through a series of steps. The sequence of panes may include data entry fields that can receive data from the client device, and provide targeted selection choices based on the received data.

The sequence of panes may include a representation selection pane that presents the grouping of representations of configuration items selected by the user. The user can select a particular representation from among these representations of configuration items. This may be referred to as a "master representation." The grouping of representations of configuration items can be consolidated into the selected master representation such that a single representation of the corresponding configuration item is stored in the CMDB.

Though a plurality of representations may exist for the same configuration item, and though the representations may share similar attribute values, the attribute values for respective representations of configuration items might be in conflict. For instance, different duplicate representations may have different asset tags, serial numbers, etc. Accordingly, the sequence of panes may also include an attribute selection pane that is presented after a master representation of the configuration item is selected. The attribute selection pane can provide each conflicting attribute associated with the duplicate representations. The user can select from the conflicting attributes to finalize the attributes associated with the master representation of the configuration item.

In this fashion, the GUI can guide a user through a de-duplication process that ensures that a single representation is stored in the CMDB for a given configuration item. In some instances, the remote network management platform can perform these steps automatically. For example, a user can set default de-duplication rules for a server to follow once a set of duplicate representations has been determined for a given configuration item.

Example embodiments follow that describe how a set of duplicate representations of the same configuration item can be consolidated into a single representation of the configuration item.

FIG. 6 depicts a GUI 600, in accordance with example embodiments. GUI 600 may be provided by the server device to manage groupings of representations of configuration items that have been determined as duplicates, and to ultimately adjust the representations of configuration items stored in the CMDB. GUI 600 includes a selectable de-duplication tasks list 602 includes identifying information for each de-duplication task and data entry fields that correspond to each task in the list. A user might take the information in de-duplication tasks list 602 into account when selecting from tasks in the list. For example, the list may include a short description, priority level, and number of duplicates that allow the user to make an informed decision on which task to complete. The short description can show a desired class for de-duplication, the priority can show which duplication task is most important based on a predetermined metric, and the number of duplicates can show when de-duplication of a set of duplicate representations stands to make a large impact on the CMDB.

Each de-duplication task in tasks list 602 may correspond to a data entry field that represents a set of duplicate representations of a given configuration item.

A user can select one or more tasks, and select a "remediate option" in GUI 600. The server device may receive an indication that the "remediate" option has been selected and that one or more de-duplication tasks have been selected. Based on the selection of the "remediate" option, the server device may provide one or more of a series of panes to facilitate de-duplication of each selected set of duplicate records in de-duplication tasks list 602. Examples of such series of panes follow. FIGS. 7A, 7B, 7C, 7D, and 7E depict a GUI 700, in accordance with example embodiments. GUI 700 may generally include data entry fields that allow a user to consolidate a plurality of duplicate representations of a particular configuration item into a single representation. In particular, GUI 700 may include a sequence of panes that guide a user through the process of replacing the plurality of representations with a single representation.

In the present example, GUI 700 includes a representation selection pane 702 that allows a user to select a master representation from the plurality of duplicate representations, an attribute selection pane 704 that allows a user to merge attribute values from the plurality of duplicate representations into a single set of attribute values that correspond to the master representation, a relationships and related items pane 706 that allows a user to specify relationships and related items to be merged with the master representation, a duplicate representation actions pane 708 that allows a user to determine what to do with duplicate representations, and a confirmation pane 710 that indicates characteristics of the master representation, and allows the user to confirm that those characteristics are correctly set before instructing the remote network management platform to consolidate the duplicate representations.

FIG. 7A shows representation selection pane 702, which includes a representation display 712, which in turn includes a selectable representation list option 714 and a duplicate representation list 716. List option 714 includes an option to view all duplicate representation (labelled "all" in the present example) or to view a truncated recommended representation list (labelled "recommended" in the present example). Representation selection pane 702 also includes a plurality of data entry fields that correspond to items in the list and allow for specification of a particular representation of the plurality of duplicate representations for use in creating a masterrepresentation of the configuration item. Selection of a duplicate representation from list 716, causes the server device to generate the master representation based on the selected representation. Duplicate representation list 716 may include information relevant for determining which representation should be selected. For instance, duplicate representation list 716 can include a date of creation for each representation, a most recent update date for each representation, and a number of related items for each representation. Other information for display is possible as well.

In the present example, the truncated recommended representation list option has been selected from list option 714. The truncated list includes three recommended representations that are determined according to predetermined rules. A first representation has been determined as the "oldest created" representation, and may be determined by comparing the duplicate representations to identify a representation that was created at a date and time before any other representation in the plurality of duplicate representations. A second representation has been determined as the representation having the "most related items," and may be determined by comparing a number of records of interactions between the configuration item and the remote network management platform stored in each representation to identify a representation having the most such stored records. A third representation has been determined as the "newest updated" representation, and may be determined by comparing the duplicate representations to identify the most recently updated representation in the list.

Representation selection pane 702 also includes an option to "use master representation" or "remediate manually." Selecting the option to use the master representation allows a user to simply use the master representation as the single representation of the particular configuration item and to discard attribute values and other information associated with the other representations in the plurality. Selecting the option to remediate manually allows the user to select particular asset values, relationships, or other information associated with the plurality of duplicate representations. In the present example, the "oldest created" representation has been selected, and the "remediate manually" option has been selected. Selection of the "remediate manually" option may cause the server device to present additional panes in the sequence by way of GUI 700. In particular, selection of the "remediate manually" option causes GUI 700 to display attribute selection pane 704.

FIG. 7B shows attribute selection pane 704, which includes an attributes display 718, which in turn includes an attribute value list 720. Attribute selection pane 704 generally allows a user to select particular attribute values to be used in setting attribute values for the master representation. After selection of the master representation, a user can determine whether to keep attribute values from the master representation or to update them. Attribute value list 720 may be simplified to facilitate efficient updates to the master representation. For example, some attribute values may be consistent across all of the duplicate representations of the configuration item. Accordingly, the list might only include attribute values that are in conflict.

FIG. 7B shows that some attribute values are empty for the master representation, but that other duplicate representations have non-empty values associated with the attribute. For instance the master representation does not have a value for the "warranty expiration" attribute, but 120 other representations do have such a value. A user can decide to add this information to the master representation by selecting an option to expand the "other values" for the "warranty expiration" attribute.

Upon selection of an option to expand the "other values" for the given attribute, a selectable list of attribute values may be provided. Though not depicted in FIG. 7B, the selectable list of attributes may show what values are associated with the duplicate representations, and may provide additional information that assists a user in selecting a value. For instance, the list of attribute values may include an indication of when a given attribute value was last updated, or specify an authoritative device that updated that attribute value. Selecting such an attribute value may cause the server device to replace an attribute value in the master representation with the selected attribute value. For example, each representation may be an object associated with one or more data structures, and selecting a given value may cause a server device associated with the remote network management platform to change data stored in the object based on the selection from the list of attribute values.

Selecting desired values from attribute value list 720 can serve to determine a set of attribute values for the master representation. However, as described above with regard to FIG. 7A, a user can simply opt to use the attribute values from the selected master representation. In other examples, attributes may be selected according to predetermined rules. For example, the most common attribute value may be used for each given attribute of the set. In other examples, each most recently updated value may be used. Other predetermined rules are possible as well. In the example depicted in FIG. 7B, once desired attribute values are selected from attribute value list 720, a user can select an option to move to a "next" pane, which causes the server device to display another pane in the sequence by way of GUI 700. In particular, selection of the "next" option, causes GUI 700 to display relationships and related items pane 706.

Figure 7C:
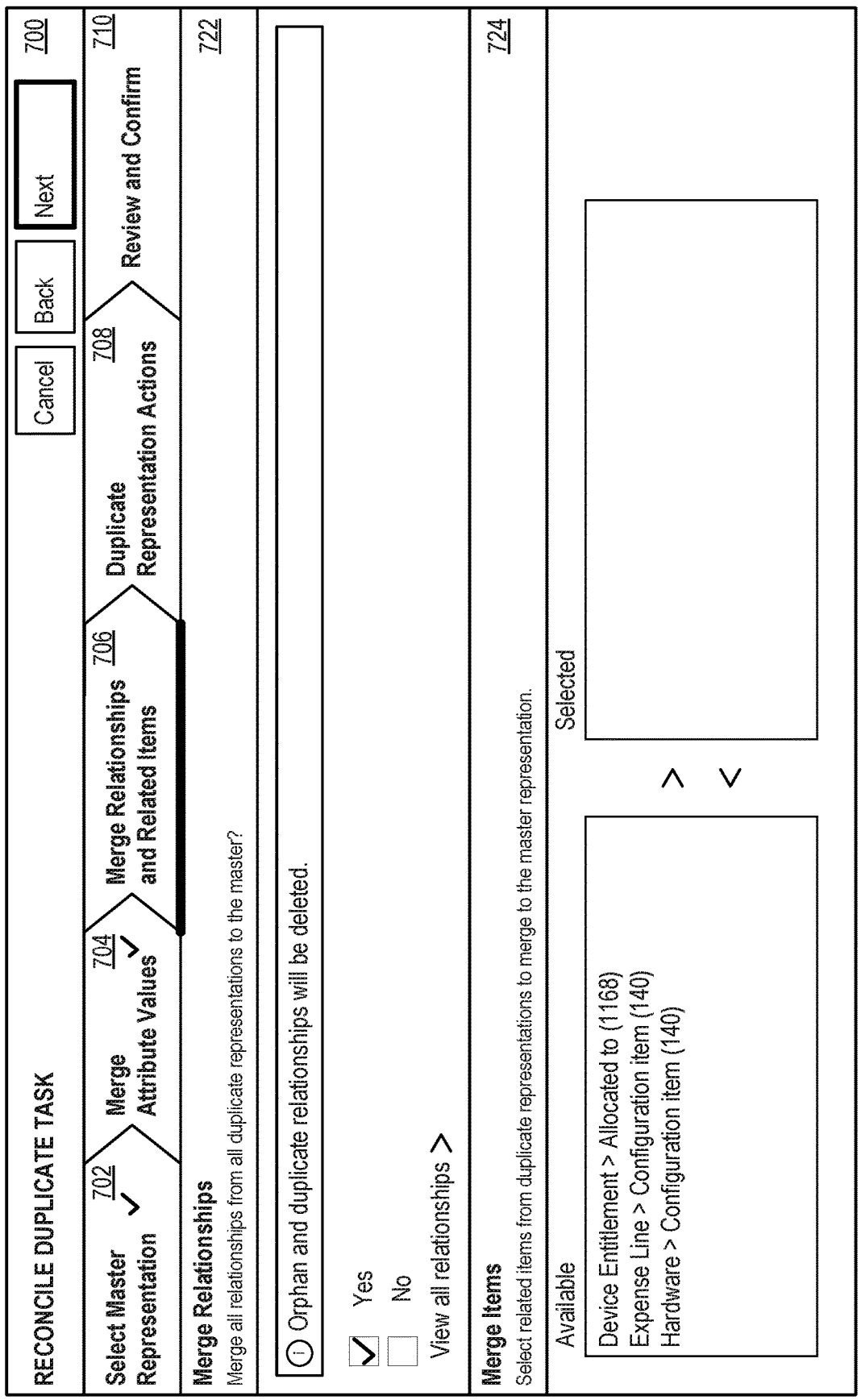

FIG. 7C shows relationships and related items pane 706, which includes a relationships display 722 and a related items display 724. Relationships display 722 may allow a user to merge all relationships included in the plurality of duplicate representations of the particular configuration item into the master representation. Relationships may generally define an operational association between two or more configuration items. For example, where the particular configuration item is a software application and is related to a computing device, the relationship type may be "runs on," signifying that the software application is used by the computing device to perform operations.

Each duplicate representation of the particular configuration item may include a set of relationships. Merging the relationships may include combining, by the server device, a plurality of sets of relationships that correspond to the plurality of duplicate representations into a single set of representations. Combining the plurality of sets may include determining a set of unique relationships from the plurality of duplicate configuration items. The server device may further consolidate the set by limiting the set to include a single representation for each representation type in the set, and set the master representation to include the merged set of representations. The server device may also set the master representation to include the set of unique relationships.

Relationship display 722 alternatively allows for discrete selection of relationships, similar to that described with regard to attribute values in FIG. 7B. For example, a user may select an option to "view all relationships," which will show all relationships defined by the duplicate representations of the particular configuration item. A plurality of data entry fields may be presented so that a user can select from among the relationships to create a set of relationships. The server device may set the master relationship to include the selected set of relationships.

Related items display 724 includes an option to select items associated with the duplicate representations of the particular configuration item to merge into the master representation. An "item" may include an indication of an interaction between a configuration item, or representation thereof, and the remote network management platform. For example, an item may include a record of a change in the corresponding representation, a security operations interaction with the configuration, an asset allocation determination for the corresponding representation, or other similar interactions. In the present example, related items display 724 shows 1168 instances of the particular configuration item being allocated a device entitlement, 140 instances of expense lines being determined for the configuration item, and 140 instances of the configuration item being identified as a hardware component of the managed network. A user can select any or all of these items to be merged into the master representation.

Though relationship display 722 and related items display 724 are depicted in FIG. 7C as being part of a single pane, it should be understood that relationships and items pane 706 may be included within two or more panes, or may be merged into the master representation automatically according to predetermined rules. In the example depicted in FIG. 7C, once desired relationships and items have been merged into the master representation, a user can select an option to move to a "next" pane in the sequence, which causes the server device to display another pane in the sequence by way of GUI 700. In particular, selection of the "next" option causes GUI 700 to display relationships and representation actions pane 708.

FIG. 7D shows a representation actions pane 708, which allows for a determination as to how duplicate representations are treated after a master representation has been selected, and attribute values, relationships, and items have been selected for merging into the master representation. Representation actions pane 710 includes an action display 726 that includes a selectable option to "delete" or "retire" the duplicate relationships. Selection of the "delete" option causes the server device to remove the duplicate representations from the CMDB. Selection of the "retire" option causes the server device to re-designate the duplicate configuration items so that the representations remain stored in the CMDB, but they are not used to identify the configuration item. Rather, for either selection, only the master representation will be used to represent the configuration item.

Though a master representation is selected from the plurality of duplicate representations, consolidating the duplicate representations into the selected master representation may include copying the master representation, and merging selected attributes, relationships, and items into the copy of the master representation. In such examples, the master representation may ultimately be deleted or retired, while the copy serves as the master representation.

In the example depicted in FIG. 7D, once an action has been selected for the duplicate representations, a user can select an option to move to a "next" pane in the sequence, which causes the server device to display another pane in the sequence by way of GUI 700. In particular, selection of the "next" option causes GUI 710 to display confirmation pane 708.

Figure 7E:
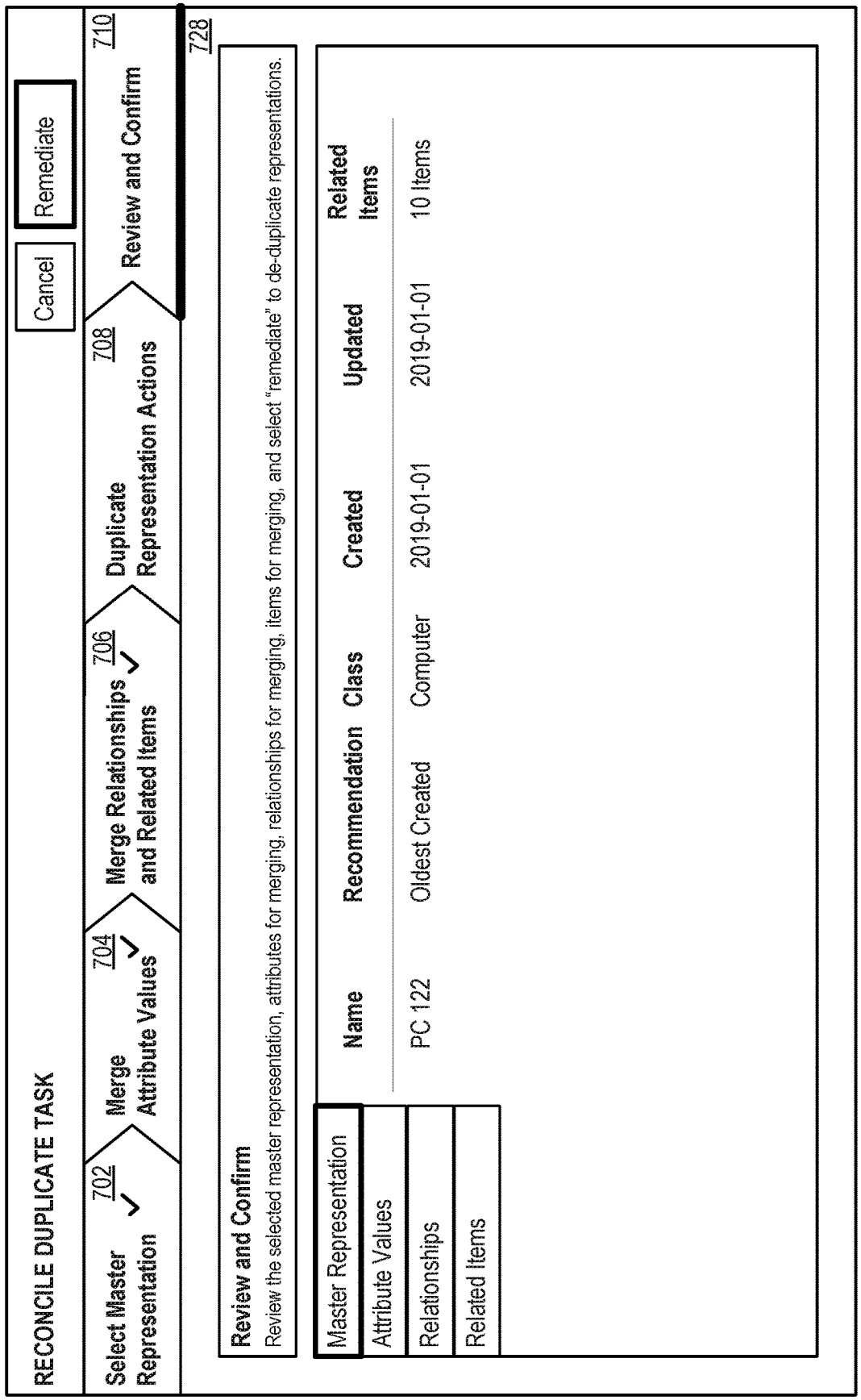

FIG. 7E shows confirmation pane 710, which includes a review display 728. Review display 728 includes data entry fields that allow a user to view the selected master representation, attributes thereof, relationships thereof, and items thereof. A user can use this information to determine what the master representation will include when the duplicate representations are consolidated into the master representation. After review, a user can select the "remediate" option, which may consolidate the duplicate configuration items into the master configuration items based on the inputs received via the data entry fields in the sequence of panes.

As described above, one potential cause of duplicate representations of a particular configuration item is the use of an ineffective identification rule during discovery. Accordingly, once the remediate option is selected, the GUI may present one or more options to change an identification rule to avoid future duplicates of the configuration item. The options may include suggested changes to the identification rule. For instance, the server device may determine an attribute with a relatively large number of conflicts, and suggest that attribute be added to the identification rule, assuming it is not already part of the rule.

Though a sequence of panes 702, 704, 706, 708, and 710 are depicted in FIGS. 7A, 7B, 7C, 7D, and 7E, one or more of these panes may be combined together or removed entirely and still allow the server device to consolidate the duplicate representations into a single representation of the configuration item. For example, as described above, in some embodiments the GUI might only include representation selection pane 702, and use the attribute values, relationships, and items associated with the master representation to define the resulting representation of the configuration item. In other examples, the sequence of panes may only include representation selection pane 702, and attributes selection pane 704, and exclusively use selections from these two panes to consolidate the duplicate representations. In still other examples, the server device may receive instructions to consolidate the duplicate representations automatically in accordance with predetermined rules. For instance, a user may interact with the GUI to set particular rules for consolidating a class of configuration items, and each de-duplication task that involves a configuration item in the class of configuration items may be treated according to the set rules.

VII. EXAMPLE SCENARIO FOR DE-DUPLICATING REPRESENTATIONS OF A CONFIGURATION ITEM

In an example scenario, a user may wish to accurately determine a number of personal computing devices associated with a managed network of the "computer" class. The user may use a client device to access a GUI that allows the user to interact with a remote network management platform. The user may navigate within the GUI to determine a number of configuration items represented as "computers" in a CMDB of the remote network management platform. However, the number of represented "computers" may be higher than expected.

The user can navigate to GUI 600 as described above with regard to FIG. 6 to determine that, indeed, two de-duplication tasks exist for configuration items designated as "computers," so the represented number of "computers" in the managed network is inaccurate. GUI 600 shows two de-duplication tasks that correspond to the "computer" class of configuration item: "TASK031" and "TASK032." The user can select "TASK031" and "TASK032" in turn to replace the respective duplicate representations with respective consolidated representations in order to provide an accurate representation of the personal computers associated with the managed network. In the example scenario, the user has selected "TASK031."

Responsive to receiving an indication of the selection from the client device, the server device may provide for display on the client device a GUI 700, operable for determining how to consolidate the plurality of duplicate representations of the particular configuration item into a single representation. Accordingly, the user can navigate to representation selection pane 702 to determine a representation to use as the master representation. In the example scenario, the user selects "recommended" from list option 714 to avoid reviewing all 141 duplicate representations of the same configuration item and to review a truncated list of representations which are determined according to predetermined rules. As described above, duplicate representations may result from ineffective identification rules. In this case, having 141 duplicate representations may be indicative of an improperly defined identification rule that has been used during several rounds of discovery, which allowed duplicate representations to accumulate over time.

In the example scenario, the user selects the "oldest created" representation from a plurality of data entry fields corresponding the truncated list. Because there are a large number of duplicate representations, some of the representations are likely to contain different attribute values, relationships, or related items than those associated with the master representation. Accordingly, the user may select a "remediate manually" option rather than a "use master representation" option. This selection navigates the user to another pane in the sequence of panes provided by GUI 700.

The server device next provides for display on the client device, by way of GUI 700, an attribute value selection pane 704. The user may review attribute value list 720 and determine that there are several attributes for which the master representation does not have a value. Though the user could select an option to go "back" to representation selection pane 702 and choose a different representation, the user may wish to keep values from the oldest created representation, and may choose to populate the empty values with those associated with other duplicate representations. After determining a set of attribute values for the selected master representation, the user can select "next" to navigate to the next pane in the sequence of panes.

The server device next provides for display on the client device, by way of the GUI, a relationships and items pane 706. The user may select an option in relationship display 722 that allows for records of relationships associated with each duplicate representation to be merged into a single set of relationships for use with the master representation. As noted above, an "item" in the context of GUI 700 relates to records of interactions between the configuration item and the remote network management platform. Accordingly, a related items display 724 may be provided that allows for records of interactions between the configuration item and the remote network management platform to be merged into records associated with the master representation.

In the example scenario, 1168 records related to device entitlements for the duplicate representations are available for merging into the master representation. In the context of a managed network, an entitlement may relate to a licensing right held by the managed network. Since records of these allocations of device entitlements may be lost if the device entitlement records are not selected, the user may select this item for merging with the master representation. However, since there are 140 "expense line" and "hardware" items, which correspond to the number of duplicate representation other than the master representation, and because these records may conflict with the records associated with the master representation, the user may choose not to select these items. After determining whether to merge relationships and items into the master representation, the user can select "next" to navigate to the next pane in the sequence of panes.

The server device next provides for display on the client device, by way of the GUI, a duplicate representation actions pane 708. Actions display 726 allows the user to delete duplicate representations other than the master representation. For example, the user may select this option if the master representation includes a comprehensive set of attribute values that accurately represents the configuration item. The user can select "next" to navigate to the next pane in the sequence of panes.

The server device next provides for display on the client device, by way of the GUI, a confirmation pane 710. The user can review the master representation attribute values, relationships, and items. In the example scenario, the user selects "remediate" to consolidate the selected information into the master representation and to delete the other duplicate configuration items. As the representations are consolidated, the server device presents the user with an option to adjust an identification rule that corresponds to a class of the configuration item. In the example scenario, the configuration item is in the "computer" class, so the identification rule can correspond to the "computer" class. Further, changes to the identification rule may be suggested based duplicate representations. For example, in the example scenario, additional attributes may be selected for the identification rule to prevent duplicate representations during future discovery of the configuration items.

This provided example scenario is one of many such examples, and should not be construed as limiting. For example, any number of master representations could be determined using similar steps. Further, though a user is described as interacting with each pane of the sequence, some user interactions may be performed automatically, or not at all, while still allowing the master representation to be determined.

As described above, various discovery procedures and manual entries can cause the creation of duplicate representations of configuration items. These duplicate representations can cause operational difficulties for an enterprise, because the resulting representations inaccurately reflect assets to which the enterprise has access. The example scenario shows that the de-duplication process can alleviate this problem by allowing a user to determine an accurate representation of the number of computing devices in the "computer" class.

The duplicates can also cause problems for the remote network management platform, as duplicate representations waste memory space in the CMDB. The example scenario is one of many where the remote network management platform stands to save space in memory. Rather than storing 141 representations of the particular configuration item, the de-duplication process presented herein allows a single representation to be stored in the CMDB. As a result, storage space is saved. Also, workflows and orchestrations that rely on configuration items being correctly defined are more likely to operate properly.

VII. EXAMPLE OPERATIONS

Figure 8:
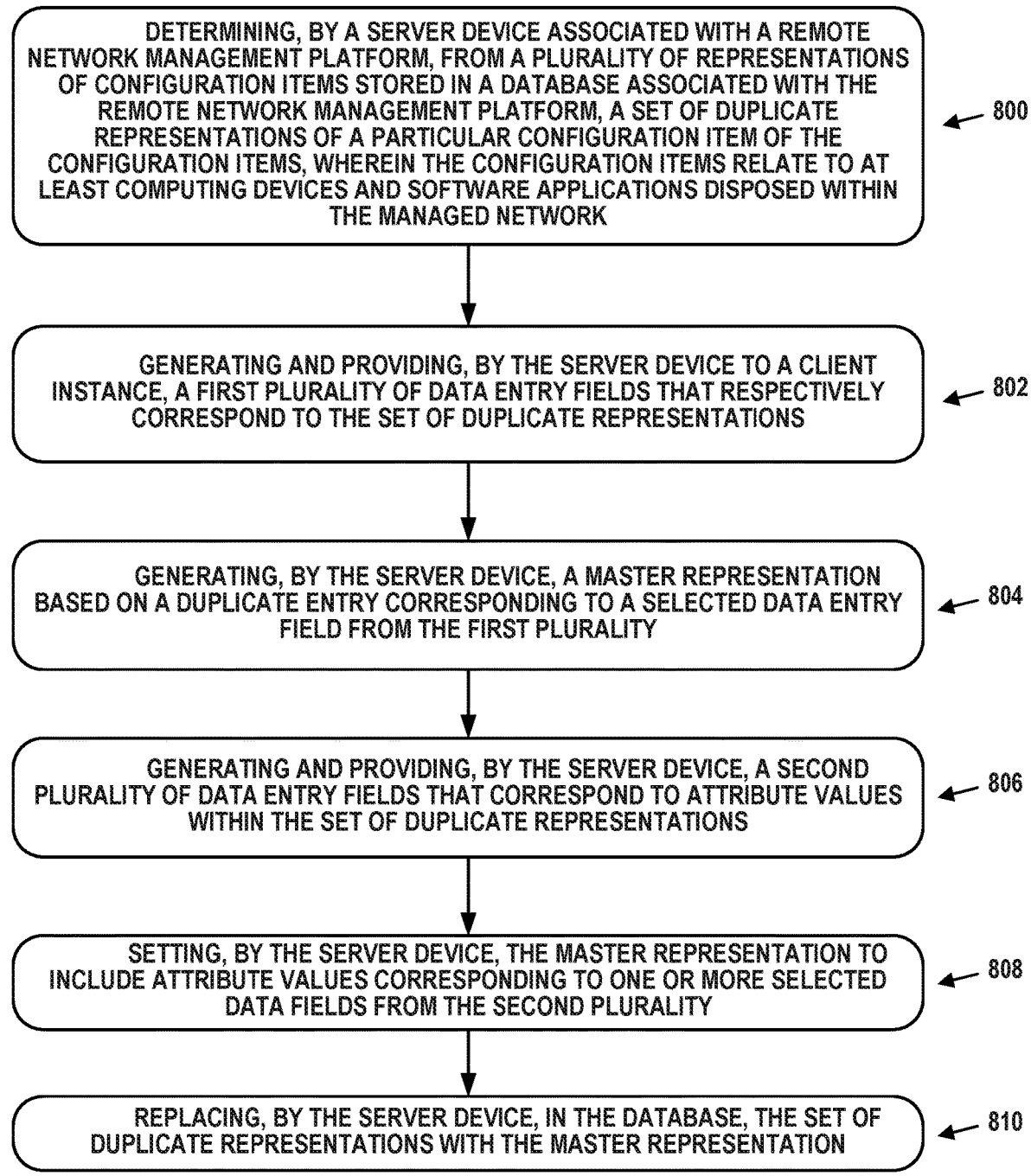
FIG. 8 is a flow chart, in accordance with example embodiments.

FIG. 8 is a flow chart illustrating an example embodiment. The process illustrated by FIG. 8 may be carried out by the "server device" described above with regard to FIGS. 6, 7A, 7B, 7C, 7D, and 7E, or any computing device associated with a remote network management platform, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. For instance, though GUI 700 is depicted as including five sequentially-related panes, certain of the panes may be removed or combined in practice. Further, these embodiments may be combined with features, aspects, and/or implementations of any of the previous figures or otherwise described herein.

A. Determining a Set of Duplicate Representations

Block 800 may be carried out to determine, by a server device associated with a remote network management platform, from a plurality of representations of configuration items stored in a database associated with the remote network management platform, a set of duplicate representations of a particular configuration item of the plurality. The database may refer to, for example, the CMDB described above. The configuration items may relate to at least computing devices and software applications disposed within the managed network. For instance, configuration items may refer to any or all of client devices 302, server devices 304, routers 306, and virtual machines 308, any applications or services executing thereon, as well as relationships between devices, applications, and services.

In some examples, the server device may determine a plurality of sets of duplicate representations of configuration items, and consolidate a selected set. Accordingly, the server device may, prior to providing a sequence of panes for consolidating duplicate representations of the particular configuration item, generate and provide a plurality of data entry fields that respectively correspond to one or more sets of duplicate representations that include the set of duplicate representations of the particular configuration item. The plurality of data entry fields for specification of the set of duplicate representations may be referred to as a third plurality of data entry fields. The server device may receive, from the client instance or client device (a client instance may be any hardware or software performing client functions), an indication that a data field from the third plurality of data entry fields was selected. The data entry field from the third plurality may correspond to the determined set of duplicate representations of the particular configuration item. The third plurality of data entry fields may be provided in a de-duplication tasks pane, such as de-duplication tasks pane 600 described above with regard to FIG. 6. The server device may further be configured to consolidate the selected set of duplicate configuration items after the set is selected.

B. Consolidating a Set of Duplicate Representations

The embodiment depicted in FIG. 8 may consolidate the determined set of duplicate representations of the particular configuration item into a single representation of the particular configuration item. A series of operations may be carried out to accomplish this. Block 802 may be carried out to generate and provide, to a client instance or client device, a first plurality of data entry fields that respectively correspond to the set of duplicate representations. For example, the first plurality of data entry fields may be similar to those corresponding to duplicate representation list 716 described above with regard to FIG. 7A.

Providing the first plurality of data entry fields may include providing a selectable option for the server device to provide a truncated list of representations from the set. In such examples, the embodiment may further determine a recommended representation according to a predetermined rule, and the truncated list can include an indication of the recommended representation. An example predetermined rule may include determining an "oldest created" representation by comparing times at which each respective duplicate representation was created, identifying a representation that was created before any other representation of the plurality of duplicate representations, and setting the identified representation as the recommended representation. Another example predetermined rule may include determining a "newest updated" representation by comparing times at which each respective duplicate representation was created, identifying a representation that was created before any other representation of the plurality of duplicate representations, and setting the identified representation as the recommended representation.

The embodiment may further be carried out to receive, from the client instance or client device, an indication that a data field from the first plurality of data entry fields was selected. For example, in FIG. 7A the indication may show that the "oldest created" representation has been selected.

Block 804 may be carried out to generate a master representation based on a duplicate representation corresponding to the data entry field from the first plurality. In some examples, generating the master representation based on the duplicate representation corresponding to the data entry field from the first plurality may include copying the duplicate representation corresponding to the data entry field, and setting the copy as the master representation. In such examples, the duplicate representation corresponding to the data entry field of the first plurality may ultimately be removed from the CMDB, while the copy is stored in the CMDB. In other examples, generating the master representation based on the duplicate representation corresponding to the data entry field from the first plurality can include setting the duplicate representation corresponding to the data entry field as the master representation. In such examples, the duplicate representation corresponding to the data entry field may remain stored in the CMDB, but aspects of the duplicate representation may be changed.

Block 806 may be carried out to generate and provide, to a client instance or client device a second plurality of data entry fields that correspond to attribute values within the set of duplicate representations. The second plurality of data entry fields may be similar to the data entry fields depicted in attributes selection pane 704 described above with regard to FIG. 7B. The second plurality of data entry fields might be presented based on the received master representation. For example, providing the second plurality of data entry fields may include providing an indication of attribute values that correspond to the master representation. Each data entry field of the second plurality may include an option to replace an attribute value that corresponds to the master representation. In such examples setting the master representation to include attribute values corresponding to the one or more data entry fields includes selectively adjusting attribute values of the master representation to match attribute values corresponding to the one or more data entry fields. For instance, in FIG. 7B an "installed" attribute is depicted as having a master representation value of "2018-12-30." A data entry field shows that there are 128 other values to choose from, and selecting the data entry field may allow a user to specify a different attribute value for the "installed" attribute.

The embodiment may be further carried out to receive, from the client instance or client device, an indication that one or more data entry fields from the second plurality of data entry fields was selected. For example, in FIG. 7B, one of the "other values" of attributes display 718 may be selected.

Block 808 may be carried out to set the master representation to include attribute values corresponding to the one or more data entry fields. For example, one or more attributes values of the master representation may change based on a selection from the second plurality of data entry fields.

Block 810 may be carried out to replace, in the database, the set of duplicate representations with the master representation. For example, replacing the set of duplicate representations may include providing a selectable option to delete duplicate representations other than the master representation. The selectable option may be similar to that depicted in FIG. 7D. Replacing the set of duplicate representations may further include receiving, from the client instance or client device, an indication that the option to delete the duplicate representation other than the master representation was selected, and removing the duplicate representations other than the master representation from the database.

In some examples, the embodiment may further include, prior to replacing the set of duplicate representations, generating and providing a selectable option to merge relationships included in each duplicate representation into a single set of relationships. As described above with regard to FIG. 7C, a relationship may define an operational association between two or more configuration items. The embodiment may further include receiving, from the client instance or client device, an indication that the option to merge the relationships was selected, and determining one or more unique relationships included in the plurality duplicate representations. The method may still further include generating the single set of relationships based on the one or more determined unique relationships, and set the master representation to include the merged single set of relationships.

Accordingly, in various embodiments, a master representation may be set to include different pieces of information included in the set of duplicate configuration items. For example, the master representation may include some or all of the information described above with regard to FIGS. 7A, 7B, 7C, 7D, and 7E.

C. Providing an Option to Adjust an Identification Rule

In addition to consolidating the plurality of configuration items into a single representation, the embodiment may further include generating and providing an option to adjust an identification rule for use in determining representations of a class of configuration items associated with the particular configuration item. The provided option may include one or more suggested changes to the identification rule to prevent duplicate representations of the particular configuration item occurring in the future. Such suggestions may be determined in a number of ways. For example, the embodiment may further include determining, for a given attribute of the duplicate representations, a number of conflicting attribute values, determine whether the number of conflicting attribute values and the number of duplicate representations of the particular configuration item meet a threshold level of similarity, determine that the given attribute is not used in the identification rule, and providing in the option to adjust the identification rule, a suggestion to add the given attribute to the identification rule. Other types of suggested changes to the identification rule are possible as well.

The option to adjust the identification rule may include suggested changes to the identification rule that are based at least in part on a number of representations in the set of duplicate representations.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to belong to the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:
 a database containing a plurality of representations of a plurality of configuration items associated with a managed network that is managed by the remote network management platform, wherein the plurality of configuration items relate to one or more computing devices and one or more software applications disposed within the managed network; and
 a server device configured to:
 determine a set of duplicate representations of a particular configuration item of the plurality of configuration items;
 generate and provide, to a client device, a representation of a graphical user interface, comprising:
 a first pane of a sequence of panes that correspond to respective steps in a guided process of remediating the set of duplicate representations into a master representation, wherein the first pane corresponds to a first step of the respective steps to select a particular duplicate representation of the set of duplicate representations as the master representation, and wherein the first pane comprises a first window that includes a first description of the first step for a user to follow to select the particular duplicate representation from the set of duplicate representations as the master representation and a first plurality of data entry fields that respectively correspond to the set of duplicate representations;
 generate the master representation based on the particular duplicate representation corresponding to a first selected data entry field from the first plurality of data entry fields;
 generate and provide, to the client device, a second representation of the graphical user interface, comprising:

a second pane of the sequence of panes that corresponds to a second step of the respective steps to associate one or more attribute values of the set of duplicate representations with one or more respective attributes of the master representation, wherein the second pane comprises a second window that includes a second description of the second step for the user to follow to associate the one or more attribute values with the one or more respective attributes of the master representation and a second plurality of data entry fields that correspond to a plurality of attribute values of the set of duplicate representations, the plurality of attribute values comprising the one or more respective attributes;

set the master representation to include the one or more respective attribute values corresponding to one or more second selected data entry fields from the second plurality of data entry fields; and replace, in the database, the set of duplicate representations with the master representation.

2. The remote network management platform of claim 1, wherein the first pane includes a selectable option for the server device to provide a truncated list of duplicate representations from the set, wherein the server device is configured to:

determine a recommended representation according to a predetermined rule, wherein the truncated list includes an indication of the recommended representation.

3. The remote network management platform of claim 2, wherein determining the recommended representation according to the predetermined rule comprises:

comparing times at which each duplicate representation of the set of duplicate representations was created;

identifying a duplicate representation that was created before any other duplicate representation of the set of duplicate representations; and setting the identified duplicate representation as the recommended representation.

4. The remote network management platform of claim 2, wherein determining the recommended representation according to the predetermined rule comprises:

comparing times at which each duplicate representation of the set of duplicate representations was last updated;

identifying a duplicate representation that was updated more recently than any other duplicate representation in the set of duplicate representations; and setting the identified duplicate representation as the recommended representation.

5. The remote network management platform of claim 1, wherein each data entry field of the second plurality of data entry fields comprises an option to replace an attribute value of the one or more respective attributes of the master representation with a particular attribute value of the one or more attributes values of the set of duplicate representations.

6. The remote network management platform of claim 1, wherein the server device is configured to:

prior to replacing the set of duplicate representations, generate and provide, to the client device, a third representation of the graphical user interface, comprising an option to merge one or more relationships included in each duplicate representation of the set of duplicate representations into a single set of relationships, wherein each relationship of the single set of relationships defines an operational association between two or more configuration items of the plurality of configuration items;

receive, from the client device, an indication of a selection of the option to merge the relationships;

determine one or more unique relationships included in the set of duplicate representations;

generate the single set of relationships based on the one or more determined unique relationships; and set the master representation to include the single set of relationships.

7. The remote network management platform of claim 1, wherein replacing the set of duplicate representations with the master representation includes:

providing an option to delete one or more duplicate representations of the set of duplicate representations other than the master representation;

receiving, from the client device, an indication of a selection of the option to delete the one or more duplicate representations other than the master representation; and removing the one or more duplicate representations other than the master representation from the database.

8. The remote network management platform of claim 1, wherein generating the master representation based on the particular duplicate representation comprises copying the particular duplicate representation corresponding to the data entry field, and setting a copy of the particular duplicate representation as the master representation.

9. The remote network management platform of claim 1, wherein generating the master representation based on the particular duplicate representation comprises setting the particular duplicate representation as the master representation.

10. The remote network management platform of claim 1, wherein the server device is configured to:

prior to generating and providing the representation of the graphical user interface, generate and provide, to the client device, a third representation of the graphical user interface, comprising a third plurality of data entry fields that correspond to one or more respective sets of duplicate representations that include the set of duplicate representations of the particular configuration item; and receive, from the client device, an indication of a selection of a data entry field from the third plurality of data entry fields that corresponds to the set of duplicate representations of the particular configuration item.

11. The remote network management platform of claim 1, wherein the server device is configured to:

generate and provide, to the client device, a third representation of the graphical user interface, comprising an option to adjust an identification rule for use in determining a second set of duplicate representations of a class of the plurality of configuration items of which the particular configuration item is a member.

12. The remote network management platform of claim 11, wherein the server device is configured to:

determine, for a given attribute of the plurality of duplicate representations, a number of conflicting attribute values;

determine whether the number of conflicting attribute values and a quantity of the set of duplicate representations of the particular configuration item meet a threshold level of similarity;

determine that the given attribute is not used in the identification rule; and provide in the option to adjust the identification rule, a suggestion to add the given attribute to the identification rule.

13. A method comprising:
- determining, by a server device associated with a remote network management platform, from a plurality of representations of a plurality of configuration items stored in a database associated with the remote network management platform, a set of duplicate representations of a particular configuration item of the plurality of configuration items, wherein the plurality of configuration items relate to at least one or more computing devices and one or more software applications disposed within a managed network;
- generating and providing, by the server device and to a client instance, a representation of a graphical user interface, comprising:
  - a first pane of a sequence of panes that correspond to respective steps in a guided process of remediating the set of duplicate representations into a master representation, wherein the first pane corresponds to a first step of the respective steps to select a particular duplicate representation of the set of duplicate representations as the master representation, and wherein the first pane comprises a first window that includes a first description of the first step for a user to follow to select the particular duplicate representation from the set of duplicate representations as the master representation and a first plurality of data entry fields that respectively correspond to the set of duplicate representations;
- generating, by the server device, the master representation based on a duplicate representation corresponding to a first selected data entry field from the first plurality of data entry fields;
- generating and providing, by the server device and to the client instance, a second representation of the graphical user interface, comprising:
  - a second pane of the sequence of panes that corresponds to a second step of the respective steps to associate one or more attribute values of the set of duplicate representations with one or more respective attributes of the master representation, wherein the second pane comprises a second window that includes a second description of the second step for the user to follow to associate the one or more attribute values with the one or more respective attributes of the master representation and a second plurality of data entry fields that correspond to a plurality of attribute values of the set of duplicate representations, the plurality of attribute values comprising the one or more respective attributes;
- setting, by the server device, the master representation to include the one or more attribute values corresponding to one or more second selected data entry fields from the second plurality of data entry fields; and
- replacing, by the server device, in the database, the set of duplicate representations with the master representation.

14. The method of claim 13, wherein the first plurality of data entry fields comprises a selectable option for the server device to provide a truncated list of duplicate representations from the set, the method comprising:
- determining, by the server device, at least one recommended representation according to a predetermined rule, wherein the truncated list includes an indication of the at least one recommended representation.

15. The method of claim 13, wherein each data entry field of the second plurality of data entry fields comprises an option to replace an attribute value of the one or more respective attributes of the master representation with a particular attribute value of the one or more attributes values of the set of duplicate representations.

16. The method of claim 13, comprising:
- prior to replacing the set of duplicate representations, generating and providing, by the server device to the client instance, a third representation of the graphical user interface, comprising an option to merge one or more relationships included in each duplicate representation of the set of duplicate representations into a single set of relationships;
- receiving, by the server device from the client instance, an indication of a selection of the option to merge the relationships;
- determining one or more unique relationships included in the set of duplicate representations;
- generating, by the server device the single set of relationships based on the one or more determined unique relationships; and
- setting the master representation to include the single set of relationships.

17. The method of claim 13, wherein replacing the set of duplicate representations with the master representation includes:
- providing an option to delete one or more duplicate representations of the set of duplicate representations other than the master representation;
- receiving, from the client instance, an indication of a selection of the option to delete the one or more duplicate representations other than the master representation; and
- removing the one or more duplicate representations other than the master representation from the database.

18. The method of claim 13, comprising:
- generating and providing, by the server device to the client instance, a third representation of the graphical user interface, comprising an option to adjust an identification rule for use in determining a plurality of duplicate representations of a class of the plurality of configuration items associated with the particular configuration item;
- determining, for a given attribute of the plurality of duplicate representations, a number of conflicting attribute values;
- determining whether the number of conflicting attribute values and a quantity of the set of duplicate representations of the particular configuration item meet a threshold level of similarity;
- determining that the given attribute is not used in the identification rule; and
- providing in the option to adjust the identification rule, a suggestion to add the given attribute to the identification rule.

19. An article of manufacture including a non-transitory computer-readable medium, having stored thereon program instructions that, upon execution by a server device associated with a remote network management platform, cause the server device to perform operations comprising:
- determining, from a plurality of representations of a plurality of configuration items stored in a database associated with the remote network management platform, a set of duplicate representations of a particular configuration item of the plurality of configuration items, wherein the plurality of configuration items relate to at least one or more computing devices and one or more software applications disposed within a managed network;

generating and providing, by the server device and to a client instance, a first representation of a graphical user interface, comprising:
  a first pane of a sequence of panes that correspond to respective steps in a guided process of remediating a set of duplicate representations into a master representation, wherein the first pane corresponds to a first step of the respective steps to select a particular duplicate representation of the set of duplicate representations as the master representation, and wherein the first pane comprises a first window that includes a first description of the first step for a user to follow to select the particular duplicate representation from the set of duplicate representations as the master representation and a first plurality of data entry fields that respectively correspond to the set of duplicate representations;
generating, by the server device, the master representation based on a duplicate representation corresponding to a first selected data entry field from the first plurality of data entry fields;
generating and providing, by the server device and to the client instance, a second representation of the graphical user interface, comprising:
  a second pane of the sequence of panes that corresponds to a second step of the respective steps to associate one or more attribute values of the set of duplicate representations with one or more respective attributes of the master representation, wherein the second pane comprises a second window that includes a second description of the second step for the user to follow to associate the one or more attribute values with the one or more respective attributes of the master representation and a second plurality of data entry fields that correspond to a plurality of attribute values of the set of duplicate representations, the plurality of attribute values comprising the one or more respective attributes;
setting, by the server device, the master representation to include the one or more attribute values corresponding to one or more second selected data entry fields from the second plurality of data entry fields; and
replacing, by the server device, in the database, the set of duplicate representations with the master representation.

* * * * *